United States Patent [19]

Matinlassi

[11] 4,233,834
[45] Nov. 18, 1980

[54] METHOD AND APPARATUS FOR PRODUCING ZIRCALOY TUBES AND ZIRCALOY TUBES THUS PRODUCED

[75] Inventor: Ulf A. Matinlassi, Kennewick, Wash.

[73] Assignee: Sandvik Special Metal Corporation, Kennewick, Wash.

[21] Appl. No.: 6,757

[22] Filed: Jan. 26, 1979

Related U.S. Application Data

[63] Continuation-in-part of Ser. No. 789,334, Apr. 20, 1977, abandoned.

[51] Int. Cl.² .................. B21B 17/06; B21B 21/00
[52] U.S. Cl. ................................. 72/208; 72/214; 72/370
[58] Field of Search .............. 72/208, 209, 214, 220, 72/247, 199

[56] References Cited

U.S. PATENT DOCUMENTS

| | | | |
|---|---|---|---|
| 1,960,178 | 5/1934 | Albert | 72/199 X |
| 3,487,675 | 1/1970 | Edstrom et al. | 72/370 |
| 3,512,386 | 5/1970 | Teppgard | 72/189 |
| 3,808,864 | 5/1974 | Bennet | 72/247 |

*Primary Examiner*—Milton S. Mehr
*Attorney, Agent, or Firm*—H. L. Stults; P. A. Razzano

[57] ABSTRACT

Improved zircaloy tubes for PWR reactors are produced by a method and apparatus by controlling spirality, that is, the spiral formation of the wall-thickness eccentricity. In the past, that spiral formation has caused the tubes to bow during use, and the present invention permits the maintenance of that spiral formation to acceptable limits. The hollow or workpiece is positioned upon a cylindrical mandrel and is advanced step-by-step through a work zone between a pair of rolls having grooves which define the work zone. The workpiece is turned through a predetermined angle on the mandrel prior to each rocking cycle. The present invention involves controlling the angle at which the metal working forces are exerted so as to minimize the turning moment or torque effect which results in producing the spiral formation.

5 Claims, 11 Drawing Figures

METHOD AND APPARATUS FOR PRODUCING ZIRCALOY TUBES AND ZIRCALOY TUBES THUS PRODUCED

This is a continuation-in-part application of my application Ser. No. 789,334 filed Apr. 20, 1977, now abandoned.

This invention relates to producing improved zircaloy tubes, and to improved methods and apparatus for producing zircaloy tubes upon mills which have features of prior art mills which are known as McKay and FHR rockers. Mills used in practicing the present invention and the tubes have features disclosed in U.S. Pat. No. 3,478,675.

An object of this invention is to provide improved methods for producing high-quality zircaloy tubes. A further object is to provide for the above in a manner which will make it possible to reduce to an acceptable level the spiral eccentricity of zircaloy canning tubes. These and other objects will be in part obvious and in part pointed out below.

The present invention is particularly directed toward carrying out the final step or steps of producing PWR or "fuel rod" zircaloy tubes of small internal diameter from cylindrical workpieces or hollows. Tubes of this type have been produced in the general manner described below, but difficulty has been encountered because there is eccentricity in the wall-thickness and spirality is produced with respect to the eccentricity. The eccentricity is in the form of the wall thicknesses being different upon two opposite sides of the tube, even though the external and internal surfaces of the tube are substantially true cylinders. Spirality is in the form of the eccentricity being a spiral pattern of the thicker side and of the thinner side longitudinally of the tube. The length of the tube which comprises a complete turn of the spiral is referred to as the "spiral pitch". When tubes of this type are placed into service, the eccentricity tends to result in a bowing of the tube. The tubes are held in position by spacer grids which may be in the position to restrain the bowing action of the tubes. However, if the spiral pitch is substantially equal to the spacing between the spacer grids, the bowing will not be restrained and will become a serious matter. The present invention is directed toward reducing the eccentricity and the spirality. Particularly, the spirality must be reduced sufficiently to provide a spiral pitch which is not less than a predetermined length of the tube, for example, of the order of sixty to eighty inches.

Referring to the drawings.

Figure 1:
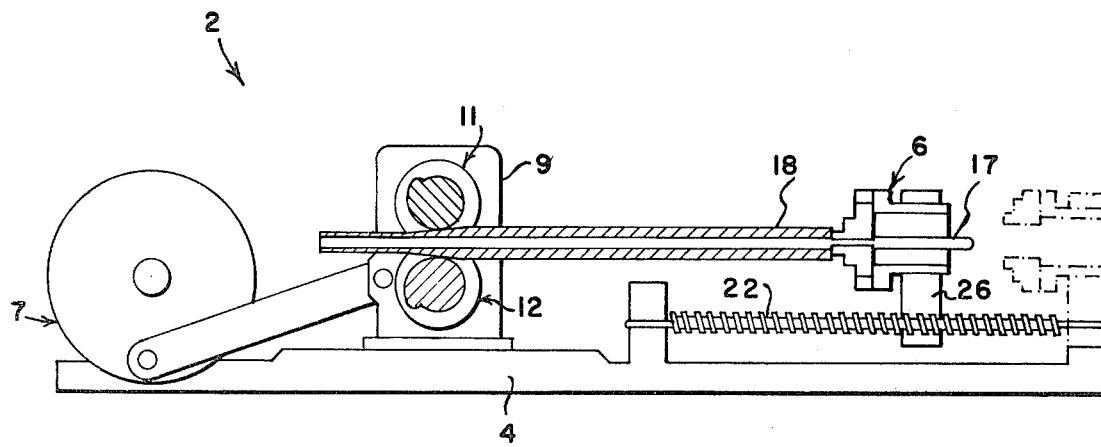
FIG. 1 is a somewhat schematic side elevation of a McKay type of rocker mill with a rollstand with two rolls incorporating the present invention.

Referring to FIG. 1 of the drawings, a McKay type rocker mill 2 is represented schematically with there being a stationary base 4, a movable chuck 6 in which is securely clamped a tubular workpiece or hollow 18. A mandrel 17 is positioned within workpiece 18 and is securely clamped at its right-hand end in chuck 6. The mandrel has a uniform external diameter which is only slightly less than the internal diameter of the workpiece. The left-hand end of the workpiece is shown (see FIG. 2) in a forming zone 33 during the forming operation which is being performed by a pair of forming rolls 11 and 12 rotatably mounted in a movable rollstand 9. Stand 9 is oscillated by a crank arm assembly 7 with the movement being such that the forming zone 33 is moved axially with respect to the workpiece.

During the forming operation, the workpiece is advanced step-by-step into and through the forming zone by a screw thread assembly having a threaded shaft 22 extending through the supporting bracket 26 for chuck 6. During each step movement of the workpiece and the mandrel, the workpiece is turned about its axis a predetermined number of degrees which is not divisible into 360. That feature has significance as will be pointed out below.

Figure 2:
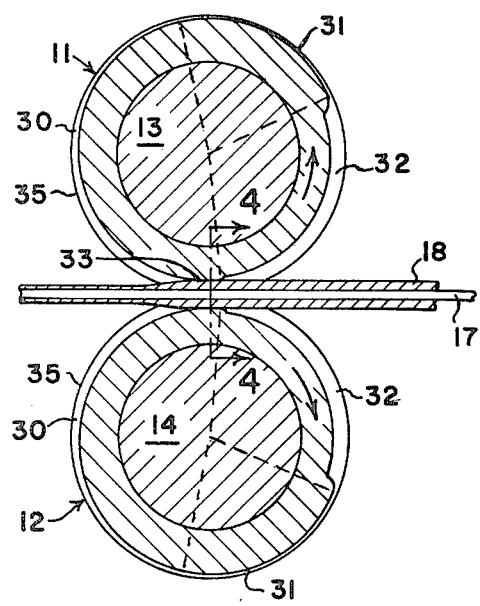
FIG. 2 is an enlarged vertical sectional view showing the tube-forming rolls of FIG. 1.
Figure 3:
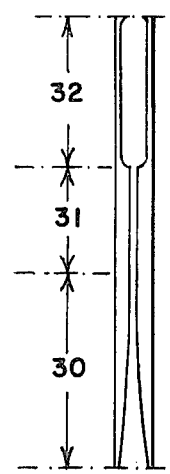
FIG. 3 is a plan view showing the groove in one of the tube-forming rolls of FIGS. 1 and 2.
Figure 4:
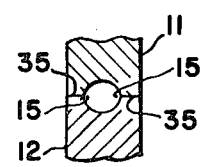
FIG. 4 is a sectional view on the line 4—4 of FIG. 2.

Referring now to FIGS. 2 and 3, rolls 11 and 12 are mounted upon shafts 13 and 14, respectively, and each of them has a forming groove (see FIG. 3) comprising a primary forming portion 30, a finishing portion 31, and a dwell portion 32. The surfaces of portions 30 and 31 of each of the grooves has a generally semi-circular cross-section the axis of which is concentric with the axis of the mandrel and the workpiece when the respective portions of the grooves mate at the forming zone as shown in FIG. 4. However, each of the grooves is widened at its edges to provide a relief area 15. The peripheral surfaces 35 of the rolls mate along a plane between the axis of the rolls which intersect the axis of the workpiece. The arc of the dwell portion 32 relative to the roll axis is usually of the order of 60–120 degrees. The primary forming portion 30 is usually longer than the finishing portion 31, and the dwell portion extends the remainder of the circumference of the roll.

During operation, the rollstand 9 oscillates to the right and left from the position shown in FIG. 1, and is shown, in fact, moving to the left in a forward stroke which is the primary tube-forming stroke movement. At that time, portions 30 of the grooves are engaging the workpiece, with roll 11 turning counter-clockwise and roll 12 turning clockwise. The movement of the rollstand carrying the rolls relative to the rotation of the rolls is such that the finishing portions 31 of the grooves move together at their ends adjacent the dwell portions 32 when the rollstand and rolls are in the extreme left-hand position. The movements are then reversed simultaneously so that the rolls start to turn in their respective opposite directions at the same time that the rollstand starts to move the rolls to the right. Most of the reduction is normally taken on the forward stroke from the right to the left. Depending on the movement of the workpiece when the rolls roll over the workpiece, a certain amount of the deformation work can be taken during the return stroke from the left to the right.

When the rollstand approaches its extreme right-hand position, the rolls have turned so that the dwell portions 32 of the grooves are mating. At that time, the workpiece is free of the rolls and a step-feed movement is produced by turning screw shaft 22 so as to feed the workpiece and the mandrel one step to the left. Simultaneously, chuck 6 rotates the workpiece the predetermined number of degrees as explained above. Each of the movements is then reversed, with the leading ends of the portions 30 of the grooves (shown at the bottom of FIG. 3) moving onto the workpiece and engaging the portion of the workpiece which has just been moved into the range of the rolls by the last step advance. That produces the primary tube-forming step with the metal flowing axially along the mandrel. There is a resultant increase in tube length which projects the left-hand end of the workpiece to the left relative to the portion of the workpiece at the right and the left-hand end of the mandrel.

Figure 5:
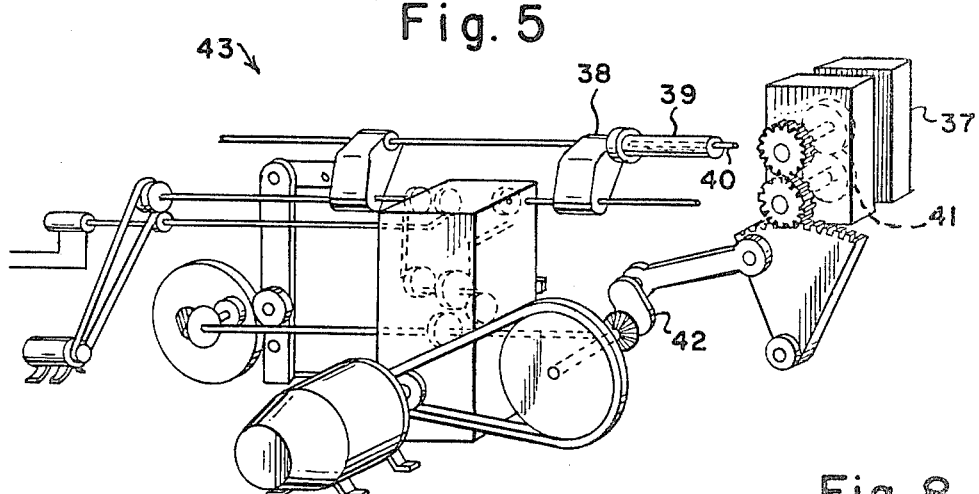
FIG. 5 is a somewhat schematic perspective view of an FHR mill rocker incorporating the present invention.

The general construction and operation of the rocker mill 43 (FIG. 5) is disclosed in U.S. Pat. No. 3,512,386, but its specific operation is similar to that of the rocker mill of FIG. 1. The rollstand 37 of mill 43 is stationary and the feed carriage 38 with the hollow 39 and the mandrel 40 are given a longitudinal movement so that the oscillating rolls roll along a generated cone. Rolls 41 are oscillated by an eccentric 42. The tube is released from the rolls at both the front and the rear position of the feed carriage. The hollow can be rotated and fed into the forming zone at either of the two extreme positions of the feed carriage.

The respective drives to produce the movements of the hollow and the rolls are known in the art. The general construction of the forming rolls is also known in the art, for example, see U.S. Pat. No. 3,487,675.

With rocker mill 2 having mandrel 17 (see FIGS. 2 and 3), at the start of the primary tube-forming movement, an unworked portion of the workpiece has been moved to the left during the dwell period so that the leading end of groove portion 30 (shown at the bottom of FIG. 3) moves down onto the unworked portion of the workpiece. That is, the rolls have moved from their mating dwell position in which groove portions 32 (FIG. 3) straddle the workpiece, with roll 11 turning counterclockwise and roll 12 turning clockwise. At that point, the two grooves have closed in on the workpiece (see FIG. 4) so as to compress and deform the workpiece wall. The worked end of the workpiece is tapered, and the roll grooves move down that tapered end. Coordinated with the roll-turning movement, the rollstand moves the rolls to the left with a linear movement pattern which is substantially the same as the movement of the peripheral surfaces 35 around the axis of the respective rolls. Stated differently, the movement of the rollstand stops during the dwell period at the right-hand end of the stroke of the crank-arm assembly and the rotary movement of the rolls is stopped at the same time, and those movements are started in reverse at the same time and the movements accelerate together.

FIG. 1 shows the mechanism during the period of the most rapid movement from right to left, after which both movements decelerate together to the point of reversal. Therefore, the groove surfaces rolling on the workpiece are pushing the metal from right to left in the forming zone. Except for the cold flow of the metal and the resultant movement of the metal with respect to the groove surfaces, the movements of the groove surfaces relative to the workpiece are rolling actions on the newly-formed tapered surface of the workpiece. The overall relationship is then the same as if the tapered end of the workpiece were positioned along the roll groove in FIG. 3, with the unworked workpiece at the bottom of the figure. The upper tapered end of the workpiece which is being worked has the general configuration of groove portions 30 and 31 and the finished portion extends upwardly through groove portion 32.

Figure 6:
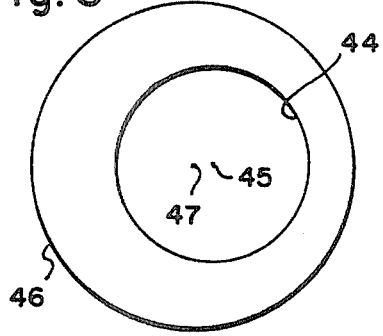
FIG. 6 is a schematic view illustrating the eccentricity in a zircaloy tube.
Figure 7:
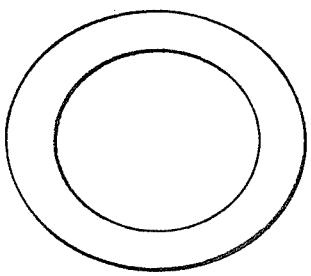
FIG. 7 is a similar view illustrating the oval formation which results from the metal working operation.

FIG. 6 shows the eccentricity of a workpiece or tube with the inner wall surface 44 having its axis at 45, whereas the outer wall surface 46 has its axis at 47. The maximum thickness t1 is at the left and the minimum thickness t2 at the right. With eccentricity being represented at t, the percent of eccentricity is equal to the difference between t1 and t2 divided by twice the average thickness of the tube wall. The diameter of the mandrel is slightly less than the internal diameter of the workpiece, and some of the metal flows to the side portions of the grooves into the relief areas 15 during each forming operation. As a result, that portion of the workpiece becomes somewhat oval-shaped or ovalized as illustrated in FIG. 7. As indicated above, the workpiece is turned around the axis of the mandrel a predetermined number of degrees at each time that the workpiece is advanced one step into the forming zone. That turning movement is referred to as "indexing" and it must be a predetermined angle which will insure uniformity in the working of the metal around the workpiece. In practice, each indexing angle is of the order of thirty-five to eighty degrees, but the number of degrees must not be divisible into three hundred and sixty. Otherwise, the angular position of the tube would be exactly the same at the end of a certain number of indexing movements and the working of the tube would not be uniform. In the simplest terms, the indexing cannot be ninety degrees or substantially ninety degrees, even though that would provide an immediate correction of the ovalized condition of the portion of the tube. Therefore, the major diameter of the ovalized portion of the tube must be turned to a position which is appreciably less than ninety degrees.

Figure 8:
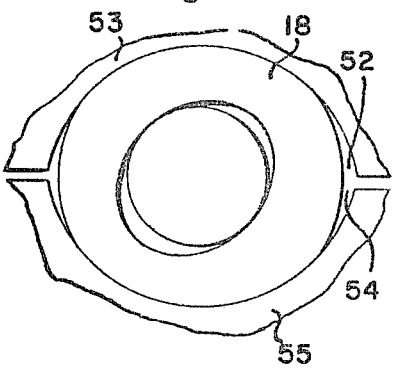
FIG. 8 is a similar view illustrating the manner in which the spiral formation is produced.
Figure 11:
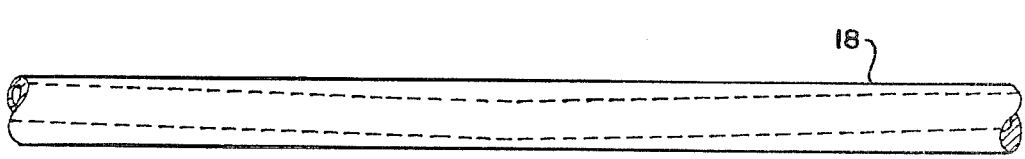
FIG. 11 is a side elevation of a zircaloy tube produced.

FIG. 8 illustrates a position of the workpiece after indexing with the major axis of the ovalized portion positioned at substantially one o'clock when considering that twelve o'clock would be the vertical position. However, in that one o'clock position of the workpiece 18 and symmetrical grooves 52 and 54, the center of the upward compressive forces exerted on the workpiece by the lower roll 55 would be substantially to the left of the mandrel axis, and the opposing downward forces exerted on the workpiece by the upper groove surface 52 is substantially to the right of the mandrel axis. Therefore, those two opposing surfaces create a substantial turning moment or torque clockwise around the mandrel axis. The workpiece is clamped by chuck 6 (FIG. 1) at its trailing (right hand) end, but that turning moment or torque at a forming zone produces a twisting action in the workpiece. As indicated above, that twists the workpiece clockwise and causes a permanent displacement of the eccentricity of the workpiece. That occurs during each step of the forming operation and produces the progressive spirality discussed above (see FIG. 11). The past efforts to reduce that twisting of the workpiece and thereby reduce the spirality of the finished tube have not met with complete success. Also, such efforts have placed limitations upon the "freedom of design" and the production operations.

Figure 9:
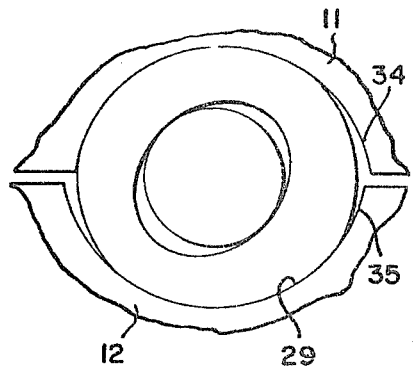
FIG. 9 is similar to FIG. 8 and illustrates the manner in which the spiral formation is controlled in accordance with the present invention.

Reference will now be made to FIG. 9 which shows schematically the forming grooves of the embodiment of FIG. 1, and is illustrative of the present invention. Groove 34 in the upper roll 11 is offset to the right with respect to groove 29 in the lower roll 12 so that the center of the forces exerted by the upper roll through the area of the surface 34 which is at a substantial angle to the horizontal and the effective forces are directed substantially toward the mandrel axis. The effective opposing forces exerted by the lower roll from surface 35 are directed in a similar manner. Hence, the compressive forces exerted upon the workpiece are equal and opposite and produce a minimal turning moment around the mandrel axis. Therefore, the twisting or angular displacing of the leading portion of the workpiece relative to the trailing portion of the workpiece is at least relatively small and the resulting spirality is within an acceptable limit.

Figure 10:
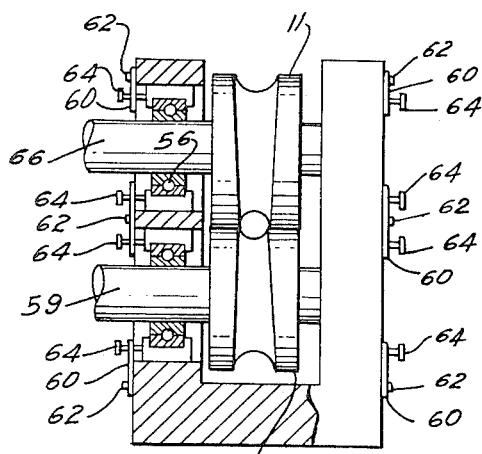
FIG. 10 is a schematic side elevation illustrating the manner in which the forming rolls of FIG. 1 are mounted.

With the arrangement of FIG. 9, the rolls must be accurately positioned in an axial direction, and roll 11 is urged to the right (FIG. 9) while roll 12 is urged to the left so that they must be held from axial movement. FIG. 10 illustrates the mounting of the rolls. There are two plates 60 clamped to the frame of the machine, each by a pair of stud bolts 62. Threaded through plate 60 are two adjusting stud bolts 64 which press against the housing of bearing 56 (FIG. 10) and position shaft 59 and its roll 12. The same arrangement is provided at the upper right-hand portion of FIG. 10 with two plates 60 mounted adjacent the right-hand end of the shaft 66 of roll 11. Two stud bolts 62 are mounted in each plate and press against the housing of bearing 56 (not shown), which is mounted on the end of shaft 66, and position roll 11.

The bearings counteract the forces exerted axially of the rolls, and the adjustment permits control of the relative axial positions of the two rolls so as to maintain the spirality within the desired limit.

One example of the finishing of the tube in accordance with the present invention will now be discussed. Workpiece 18 in FIG. 9 is indexed counterclockwise at the end of each return stroke of the metal-working movement so as to be positioned as shown in FIG. 9. With a tube having an outside diameter of 0.430 inch, the feed was 0.060 inch for each forward work step and the tube was turned simultaneously 76° counter-clockwise when viewed downstream from the right of FIG. 1. In order to provide the desired working relationship between the rolls and the tube, the upper roll is adjusted axially so that its groove was offset 0.015 inch to the right when viewed downstream. The finished tube (see FIG. 11) had a pitch length of the spiral greater than eighty inches.

From the above, it can be seen that the metal-working forces exerted upon the workpiece by the rolls are spaced from the plane extending through the axis of the mandrel and transversely with respect to the axes of the rolls. Those forces are resolved into a force urging roll 11 to the right in FIG. 10 and a force urging roll 12 to the left, and the working force of each of the rolls is directed generally toward the mandrel axis. Hence, the ovalized condition is corrected while producing a minimal turning torque against the workpiece. It is understood that optimum conditions could balance the forces in such a way as to prevent the spirality. However, as a practical matter, very satisfactory tubes can be produced having a spirality which does not interfere with the expected operation of reactors incorporating the tubes.

It is understood that variations may be made in the above methods and apparatus without departing from the scope of the invention as defined in the claims.

The mandrel can be tapered within the work zone in the manner known in the art when that is desirable.

I claim:

1. In a method of producing a metal-working pass upon a substantially cylindrical zircaloy reactor tube which includes the steps of, mounting a mandrel within a tubular zircaloy workpiece wherein the mandrel presents an outside cylindrical surface substantially mating with the internal surface of the workpiece with one end of the workpiece being positioned initially adjacent a work zone and in axial alignment therewith, moving said workpiece axially through said work zone in a step-by-step manner and turning it a predetermined turning angle about its axis with each step, rocking a pair of rolls with respect of said workpiece with said rolls exerting equal and opposite forces parallel to a plane which extends through the axis of said mandrel and transversely of the axes of said rolls and thereby exerting substantial forces upon primary working surfaces of the workpiece which are oppositely disposed thereon, with the workpiece having transverse working surfaces upon its opposite sides with their centers substantially along a line transverse of said plane, the improvement which comprises, positioning one of said rolls with its center upon one side of said plane and positioning the other of said rolls upon the other side of said plane, and wherein said turning of the workpiece is through a number of degrees which is greater than 35 and which is not divisible into 360, and the further step of restraining each of said rolls from being moved axially by the action of a component of the forces exerted by said rolls.

2. The method as described in claim 1 wherein said angle is between 35° and 80°.

3. In the method of producing zircaloy tubes wherein a zircaloy workpiece having a cylindrical longitudinal bore and a mandrel positioned within said bore are moved a series of working steps axially through a working zone and during each metal-working step the workpiece is held in fixed relationship at its trailing end, and wherein the workpiece is subjected to the metal-working action of a pair of rolls which have parallel axes and substantially identical metal-working surfaces which reduce the wall thickness of the workpiece with the rolls exerting equal and opposite metal-working forces upon respective workpiece surfaces the centers of which are diametrically opposite and wherein the workpiece is turned about the axis of the mandrel prior to each metal-working step and in which there is a tendency for said metal-working action to produce an objectionable net turning moment on the workpiece and thereby tend to twist the workpiece between said metal-working surfaces and its trailing end, that improvement which comprises offsetting said rolls axially relative to each other whereby said metal-working surfaces are offset upon opposite sides of the center plane through the axis of said mandrel and transverse to the axis of said rolls, and maintaining the above-mentioned turning of the workpiece within a range of a number of degrees which is greater than 35 and is not divisible into 360, whereby the turning moments produced by said metal-working action are substantially balanced so as to reduce to an acceptable limit the net turning moment produced on the workpiece by said rolls.

4. In a method of producing a metal-working pass upon substantially cylindrical zircaloy reactor tubes, the steps of, mounting a mandrel within a tubular zircaloy workpiece wherein the mandrel presents an outside cylindrical surface substantially mating with the internal surface of the workpiece with one end of the workpiece being positioned initially adjacent a work zone and in axial alignment therewith, moving said workpiece axially through said work zone in a step-by-step manner, turning said workpiece a predetermined turning angle about its axis with each step, rocking a pair of rolls with respect of said workpiece with said rolls exerting equal and opposite forces parallel to a plane which extends through the axis of said mandrel and transversely of the axes of said rolls and thereby exerting substantial forces upon primary working surfaces of the workpiece which are oppositely disposed thereon, with the workpiece having transverse working surfaces upon its opposite sides with their centers substantially along a line transverse of said plane, means mounting said rolls in fixed axial relationship with the center of one upon one side of said plane and the other upon the other side of said plane, and turning said workpiece through a turning angle of a number of degrees which is greater than 35 and which is not divisisble into 360.

5. In apparatus for producing zircaloy tubes wherein a zircaloy workpiece having a cylindrical longitudinal bore and a mandrel positioned within said bore which includes means to move the workpiece a series of working steps axially through a working zone and during each metal-working step to hold the workpiece in fixed relationship at its trailing end, a pair of rolls which have parallel axes and substantially identical metal-working surfaces which subject the workpiece to metal-working actions which reduce the wall thickness of the workpiece with the rolls exerting equal and opposite metal-working forces upon respective workpiece surfaces the centers of which are diametrically opposite, and means to turn the workpiece about the axis of the mandrel prior to each metal-working action wherein there is a tendency for said metal-working actions to produce an objectionable net turning moment on the workpiece and thereby tend to twist the workpiece between said metal-working surfaces and its trailing end, that improvement which comprises providing means mounting said rolls in axially offset relationship to each other whereby said metal-working surfaces are offset upon opposite sides of the center plane through the axis of said mandrel and transverse to the axis of said rolls, and with the above-mentioned means to turn the workpiece being operable within a range of a number of degrees which is greater than 35 and is not divisible into 360, whereby the turning moments produced by said metal-working action are sufficiently balanced to reduce to an acceptable limit the net turning moment produced on the workpiece by said rolls.

* * * * *